Aug. 17, 1954   L. C. HUNTER ET AL   2,686,692
DUMP TRAILER

Filed Nov. 19, 1951   2 Sheets-Sheet 1

INVENTORS
L. C. HUNTER
BY   H. B. WILSON

*A. Yates Dowell*
ATTORNEY

Aug. 17, 1954

L. C. HUNTER ET AL 2,686,692

DUMP TRAILER

Filed Nov. 19, 1951

2 Sheets-Sheet 2

INVENTORS
L. C. HUNTER
H. B. WILSON
BY
A. Yates Dowell
ATTORNEY

Patented Aug. 17, 1954

2,686,692

UNITED STATES PATENT OFFICE 2,686,692

DUMP TRAILER

Levi C. Hunter and Harold B. Wilson, Cope, Colo.

Application November 19, 1951, Serial No. 257,062

2 Claims. (Cl. 298—20)

This invention relates to transportation vehicles used in transporting heavy loads and more particularly to vehicles of the character which are towed and controlled from other or leading vehicles.

The invention is particularly concerned with trailers employed for heavy duty work and having dump bodies usually operated by a special power plant, the investment for which is a substantial consideration.

Trailers have not been completely satisfactory for various reasons, including the cost and complicated nature of the same, as well as the cumbersome mechanical equipment and the requirement of a very substantial amount of intelligence as well as labor in the operation of same. Further, with some trailers it is necessary that they be coupled not only mechanically but hydraulically with the vehicle to which they are attached, necessitating a more or less permanent hookup between them when the trailer is used.

It is an object of the invention to provide a relatively simple and inexpensive dump trailer requiring only a single hitch and capable of dumping without hydraulic equipment or hand or motorized winches, and after a lever is operated to free the body and apply the brakes, dumping can be accomplished by the mere forward movement of the towing vehicle and the body can be returned to its horizontal position by mere reverse movement of the towing vehicle.

Another object of the invention is to provide a dump trailer of a character which can be readily disconnected from its towing vehicle so that several of these trailers with the front of each of the same supported by a stiff leg or jack may be loaded while a filled trailer is being unloaded or dumped by the towing vehicle.

Figure 1:
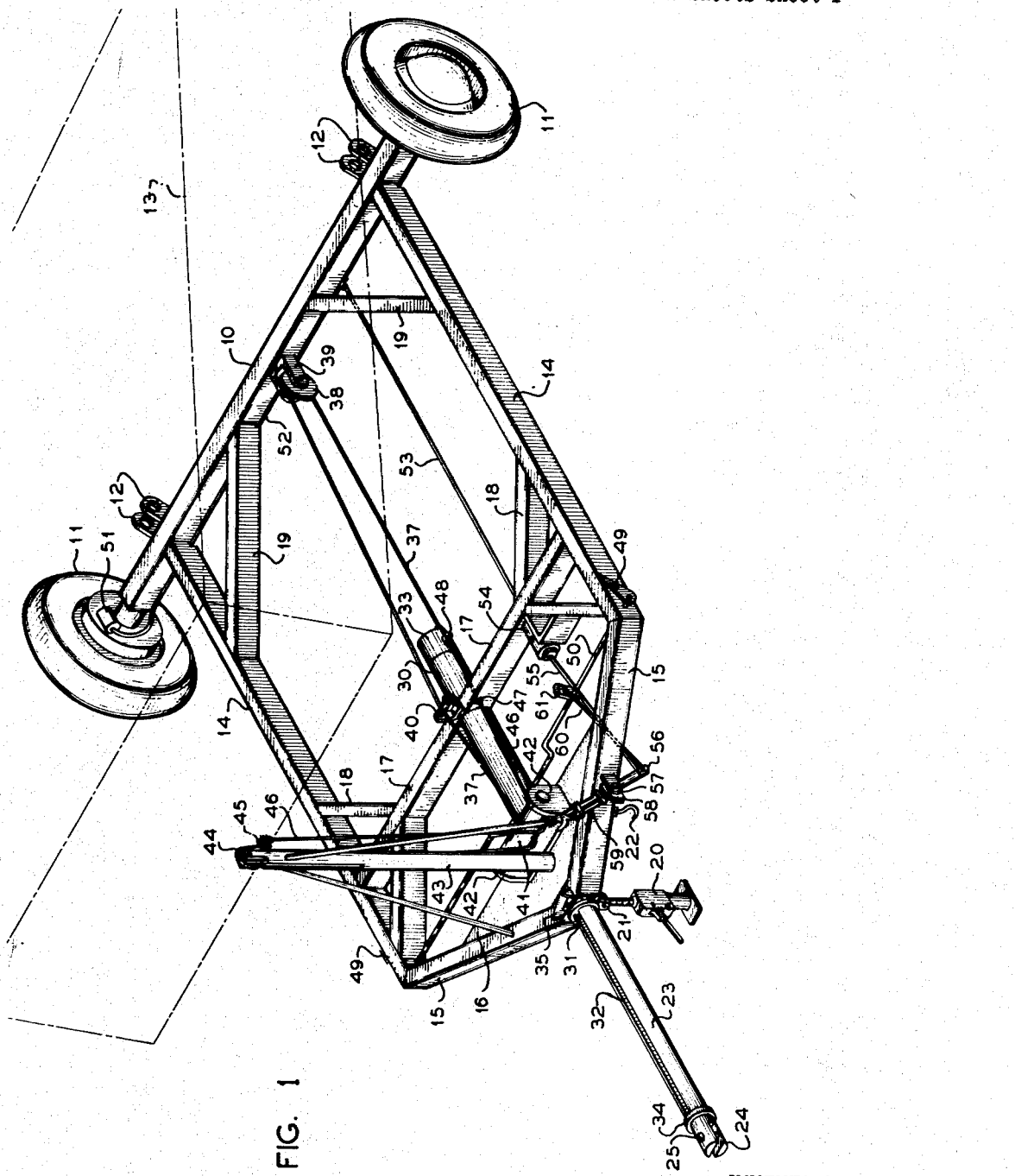
Figure 2:
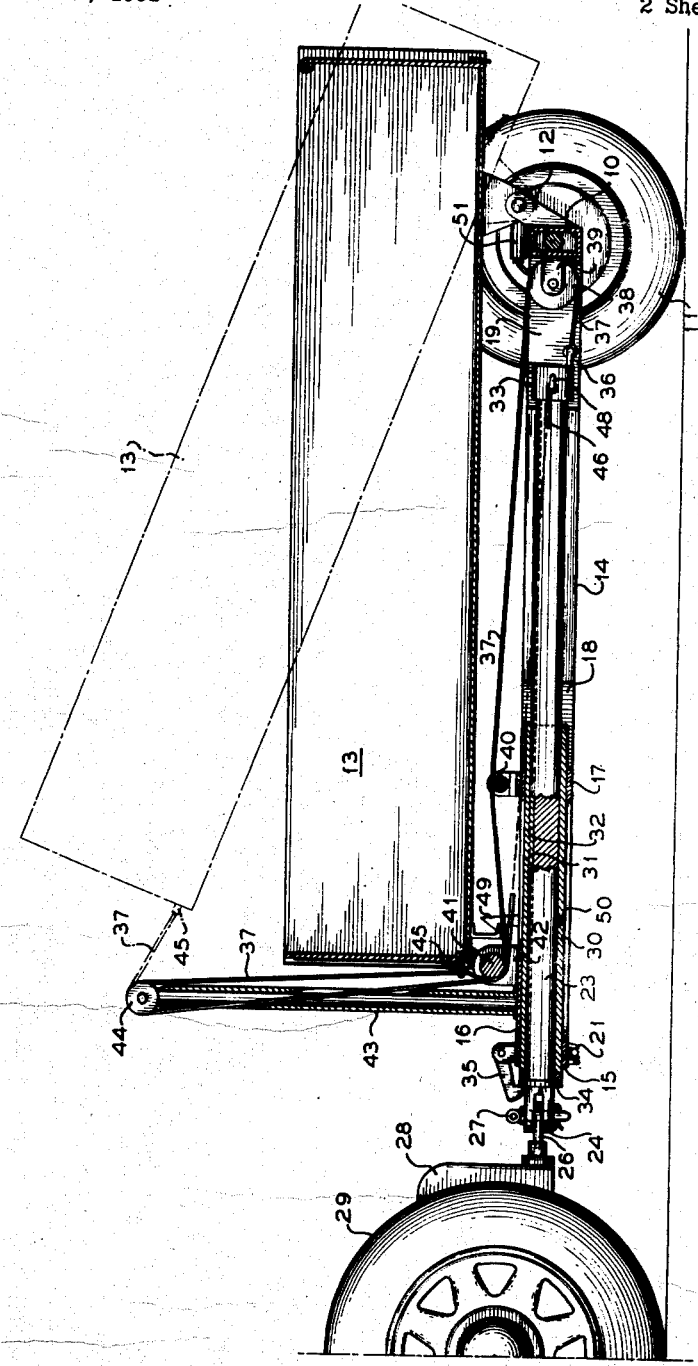

Further objects and advantages of the invention will be apparent from the following description taken in conjunction with the accompanying drawings, wherein:

Fig. 1 is a perspective illustrating one application of the invention with the dump body per se shown in tilted position in phantom, and Fig. 2 a longitudinal section of the dump trailer connected to a towing vehicle with the dump body in non-dumping position and dumping position in phantom.

Briefly stated, the invention comprises a dump trailer having a frame, a pivoted dump body thereon and operating mechanism by means of which the body may be raised at one end for dumping the contents. The trailer includes a cylinder with a slidable shaft therein to the end of which is attached a cable which extends around a pulley anchored to the rear of the frame and then around a roller adjacent the forward portion of the frame and upward through a mast and over a pulley and it is then connected to the lower intermediate forward portion of the dump body. When the reciprocable shaft is fully extended by the forward pull of the towing vehicle force will be applied through said cable to the dump body and the control of the raising and lowering of the front of the dump body of the trailer is accomplished by means of latches employed either to maintain the dump body in non-dumping position or released to permit dumping. Actuation of the latches is by means of a lever which also is employed to set the brakes when the dump body is released for dumping.

With continued reference to the drawings, the dump trailer of the present invention comprises a rear axle 10 supported by wheels 11 and provided with brackets between pairs of brackets 12 to which a dump body 13 is pivoted.

To the rear axle 10 are attached a pair of side members 14 to the forward ends of which is connected a yoke 15. A deck plate 16 braces the arms of the yoke and a cross brace or frame member 17 is spaced rearwardly thereof at each end of the same on the opposite sides of which are disposed angular braces 18, similar braces 19 being disposed between the side members 14 and the axle 10. The side members 14, yoke 15, frame members 17 and braces 18 and 19 are all of sufficient vertical dimension to provide a relatively strong, rigid frame when assembled.

In order for the frame and body of the dump trailer to be disposed in horizontal position, a jack or stiff leg 20 is pivotally connected to the center of the yoke 15 by a pair of depending ears 21. A suitable retaining hook or the like 22 is provided for securing the jack or stiff leg 20 in inoperative position.

A tow bar 23 is provided with a bifurcated front end 24 and transverse pin receiving openings 25. The bifurcated end 24 is adapted to receive a tongue 26, and a coupling pin 27 is provided for location in the openings 25 to hold the coupling pin in which pin the tongue is adapted to be received, such tongue being carried by a towing vehicle 28 having wheels 29.

The tow bar 23 is supported axially within a cylinder 30 fixed in the intermediate portion of the yoke 15 and the brace 17 of the frame. The cylinder is provided along its entire length with a key 31 received in a groove 32 in the tow bar 23. Thus the tow bar is mounted for axial nonrotary movement within the cylinder 30. Separation of these members is prevented by means of a cap 33 fixed on the rear end of the tow bar and a collar 34 fixed on the forward end of the tow bar, a latch 35 being mounted on the apex of the yoke 15 and fitting over the collar 34 for holding the tow bar retracted but being manually releasable when desired.

To the cap 33 on the rear end of the tow bar is mounted a connecting ring 36 to which is attached a cable 37 which extends around a pulley 38 mounted in a bracket 39 connected to the center of the rear axle 10. After extending around the pulley 38 the cable 37 is trained over a guide 40 mounted on the mid-portion of the frame member 17, thence the cable extends beneath a roller 41 mounted in a bracket 42 on the deck plate 16 and fixed to the latter. Thence the cable extends through a hollow upright or mast 43 and over a pulley 44, thence to a connection 45 carried by the dump body in the center of the rear lower edge of the same. By means of this structure including the cable, when the tow bar is pulled forward after release of the latch 35 it pulls the cable 37 axially of the cylinder 30, to the position shown in Fig. 1 and in phantom in Fig. 2, so that the end of the dump body is raised for dumping.

In order to cause positive lowering of the dump body, a cable 46 is attached to the fitting 45. This cable is then extended beneath the roller 41 through an opening 47 in the frame 17 and to an anchoring fitting 48 on the cap 33 of the tow bar 23. Consequently, when the tow bar is moved rearwardly, the dump body will be lowered from dumping position. It may be secured in such lowered position by means of one or more latches 49 mounted on a shaft 50 journalled in the sides 14 of the frame.

In order to hold the dump trailer stationary while the tow bar 23 is moved axially for raising and lowering of the dump body a hydraulic braking system is employed including brake cylinders 51 having feed lines 52 connected with a main line 53 communicating with a master cylinder 54. An operating arm 55 extends from the master cylinder to a lever 56 mounted on a bracket 57 on the yoke 15, conventional rachet and pawl mechanism 58 and 59 being employed for locking the lever in fixed position. To the lever is also connected a link 60 which engages an arm 61 fixed to the shaft 50. Thus by the disposition of the lever in its forward position the brakes are set and the dump body is released for tilting movement.

It will be readily understood that the present invention provides a dump trailer having simple mechanism by means of which its body may be tilted as desired, for dumping its contents without the expense of an independent power unit.

It will be obvious to those skilled in the art that various changes may be made in the invention without departing from the spirit and the scope thereof and therefore the invention is not limited by that which is shown in the drawings and described in the specification but only as indicated in the appended claims.

What is claimed is:

1. A dump vehicle comprising a frame having a pair of wheels mounted on a transverse axis adjacent the rear thereof for supporting one end of the frame during movement of the vehicle or while it is stationary, a draw bar mounted on said frame adjacent the front thereof for supporting the front end on a tractor and extending longitudinally into the frame substantially to the axis of the wheels and mounted for telescoping movement relative to the frame in a direction normal to the axis of the wheels, said mounting including a tubular member having portions providing support for the draw bar at points spaced longitudinally of said frame, means for securing said draw bar against telescoping movement relative to said frame when in its rearmost position whereby a tractor may be connected to the draw bar for moving the vehicle, a dump body pivotally mounted intermediate its ends to the rear of said frame, an upright mast mounted on said frame adjacent the front thereof in advance of the front of the body, a pulley mounted on the top of said mast, a pulley mounted on the rear of said frame substantially in line with the draw bar, and guide means adjacent the bottom of the mast for a cable, a cable fixed to the rear of the draw bar passing around the rear pulley then through the guide means adjacent the base of the mast, over the pulley at the top of the mast and fixedly connected to the front of the dump body whereby after release of the securing means the tractor may pull on the draw bar causing forward telescoping movement of the draw bar relative to the dump vehicle to tilt the dump body to unloading position.

2. The invention according to claim 1 in which a cable attached to the front of said dump body passes through the guide means to the rear end of the draw bar to which it is fixed whereby rearward telescoping movement of said draw bar relative to said dump vehicle will positively lower the dump body.

References Cited in the file of this patent

UNITED STATES PATENTS

| Number | Name | Date |
|---|---|---|
| 994,718 | Bushnell | June 13, 1911 |
| 1,170,240 | Gary | Feb. 1, 1916 |
| 2,507,033 | Marquis | May 9, 1950 |
| 2,539,507 | Corning | Jan. 30, 1951 |